(12) United States Patent
Nagai et al.

(10) Patent No.: US 10,634,786 B2
(45) Date of Patent: Apr. 28, 2020

(54) DISTANCE MEASURING DEVICE, DISTANCE MEASURING METHOD, AND PROGRAM THEREFOR

(71) Applicant: TOPCON CORPORATION, Itabashi-ku (JP)

(72) Inventors: Katsuyuki Nagai, Itabashi-ku (JP); Takahiro Maehara, Itabashi-ku (JP); Jun Abe, Itabashi-ku (JP)

(73) Assignee: TOPCON CORPORATION, Tokyo (JP)

( * ) Notice: Subject to any disclaimer, the term of this patent is extended or adjusted under 35 U.S.C. 154(b) by 312 days.

(21) Appl. No.: 15/433,722

(22) Filed: Feb. 15, 2017

(65) Prior Publication Data

US 2017/0242124 A1    Aug. 24, 2017

(30) Foreign Application Priority Data

Feb. 23, 2016   (JP) ................................ 2016-032015

(51) Int. Cl.
*G01S 17/08* (2006.01)
*G01S 7/4915* (2020.01)
(Continued)

(52) U.S. Cl.
CPC ............ *G01S 17/08* (2013.01); *G01S 7/4915* (2013.01); *G01S 17/36* (2013.01); *G01S 17/42* (2013.01)

(58) Field of Classification Search
CPC ........ G01S 17/08; G01S 17/42; G01S 7/4915; G01S 17/36
(Continued)

(56) References Cited

U.S. PATENT DOCUMENTS 5,995,233 A * 11/1999 Ohtomo ............... G01C 15/006
356/400
2004/0135992 A1    7/2004 Munro
(Continued)

FOREIGN PATENT DOCUMENTS

DE    10 2013 207 649 A1    11/2013
JP    2003-90881    3/2003
(Continued)

OTHER PUBLICATIONS

Extended European Search Report dated Jul. 24, 2017 in European Patent Application No. 17157191.2.
(Continued)

*Primary Examiner* — Daniel L Murphy
(74) *Attorney, Agent, or Firm* — Xsensus LLP (57) ABSTRACT

Decrease in a measurable distance that occurs when a distance measuring light is obliquely incident on an object is suppressed. A distance measuring device 100 includes an emitting unit 103, a detecting unit 104, a frequency-modulated component separating unit 105, a selecting unit 107, and a distance calculating unit 108. The emitting unit 103 emits distance measuring light to an object to be measured. The distance measuring light is modulated by multiple modulation frequencies. The detecting unit 104 receives and detects light of the distance measuring light that is reflected from the object. The separating unit 105 separates components of the received reflected light into multiple frequency-modulated components. The selecting unit 107 selects a frequency-modulated component that has a received-light intensity exceeding a threshold value from among the separated multiple modulation frequencies. The distance calculating unit 108 calculates a distance to the object based on the selected frequency-modulated component.

9 Claims, 5 Drawing Sheets

(51) Int. Cl.
*G01S 17/36* (2006.01)
*G01S 17/42* (2006.01)

(58) Field of Classification Search
USPC .......................................... 356/5.09
See application file for complete search history.

(56) References Cited

U.S. PATENT DOCUMENTS

| 2007/0057209 A1 | 3/2007 | Kurihara et al. |
| 2008/0100822 A1 | 5/2008 | Munro |
| 2011/0051118 A1 | 3/2011 | Sato et al. |
| 2015/0124240 A1 | 5/2015 | Wilks et al. |

FOREIGN PATENT DOCUMENTS

| JP | 2006-084430 A1 | 3/2006 |
| WO | 2010/100846 A1 | 9/2010 |

OTHER PUBLICATIONS

Notice of Reasons for Refusal dated Mar. 2, 2020 in Japanese Application No. 2016-032015.

* cited by examiner

DISTANCE MEASURING DEVICE, DISTANCE MEASURING METHOD, AND PROGRAM THEREFOR

BACKGROUND OF THE INVENTION

Technical Field

The present invention relates to a distance measuring technique using laser light.

Background Art

Techniques for measuring distances using laser light are publicly known. One such technique is disclosed in Japanese Unexamined Patent Application Laid-Open No. 2003-090881, for example.

According to this technique, laser light that is modulated by a high frequency, as a distance measuring light, is emitted to an object, light reflected from the object is detected, and then a distance to the object is calculated from a phase difference between the emitted light and the detected light. At this time, use of a modulated laser light having a higher frequency enables detection of a smaller phase difference, thereby increasing resolution of the measured distance.

In a case of performing surveys of roads or ground surfaces at a long distance, since laser light is obliquely incident on an object, the laser light is reflected from portions of the object, of which distances are different from each other, and multiple components of the reflected light are detected. The multiple components have different phases, and therefore, the waves of the multiple components interfere with each other due to phase differences, and the intensity of the detected light tends to be low. The intensity greatly decreases as the modulation frequency of the distance measuring light increases. Accordingly, a measurable distance should be shortened.

SUMMARY OF THE INVENTION

In view of these circumstances, an object of the present invention is to provide a technique for suppressing shortening of a measurable distance that occurs when a distance measuring light is obliquely incident on an object.

A first aspect of the present invention provides a distance measuring device including a distance measuring light emitting unit, a detecting unit, a separating unit, a selecting unit, and a distance calculating unit. The distance measuring light emitting unit emits measuring light to an object to be measured. The distance measuring light is modulated by multiple modulation frequencies. The detecting unit receives and detects light of the distance measuring light that is reflected from the object. The separating unit separates the detected reflected light into multiple frequency-modulated components. The selecting unit selects a frequency-modulated component that has a received-light intensity exceeding a threshold value from among the separated multiple frequency-modulated components. The distance calculating unit calculates a distance to the object based on the selected frequency-modulated component.

According to a second aspect of the present invention, in the invention according to the first aspect of the present invention, the multiple frequency-modulated components may have a frequency of a fundamental wave and a frequency of a harmonic wave of the fundamental wave.

According to a third aspect of the present invention, in the invention according to the first or the second aspect of the present invention, the selecting unit may select a component that is modulated by the highest modulation frequency from among the multiple frequency-modulated components that have received-light intensities exceeding the threshold value.

According to a fourth aspect of the present invention, in the invention according to any one of the first to the third aspects of the present invention, the distance measuring device may further include a position calculating unit that calculates a position of the object based on the distance to the object and based on a direction of emitting the distance measuring light.

A fifth aspect of the present invention provides a distance measuring method including emitting distance measuring light that is modulated by multiple modulation frequencies, to an object to be measured, and receiving and detecting light of the distance measuring light that is reflected from the object. The distance measuring method also includes separating the detected reflected light into multiple frequency-modulated components, selecting a frequency-modulated component having a received-light intensity exceeding a threshold value from among the separated multiple frequency-modulated components, and calculating a distance to the object based on the selected frequency-modulated component.

A sixth aspect of the present invention provides a computer program product including a non-transitory computer-readable medium storing computer-executable program codes for calculating a distance. The computer-executable program codes include program code instructions for emitting distance measuring light that is modulated by multiple modulation frequencies, to an object to be measured, and receiving and detecting light of the distance measuring light that is reflected from the object. The computer-executable program codes also include program code instructions for separating the detected reflected light into multiple frequency-modulated components, selecting a frequency-modulated component having a received-light intensity exceeding a threshold value from among the separated multiple frequency-modulated components, and calculating a distance to the object based on the selected frequency-modulated component.

According to the present invention, a technique for suppressing shortening of a measurable distance that occurs when a distance measuring light is obliquely incident on an object, is obtained.

PREFERRED EMBODIMENTS OF THE INVENTION

Structure of Hardware

Figure 1:
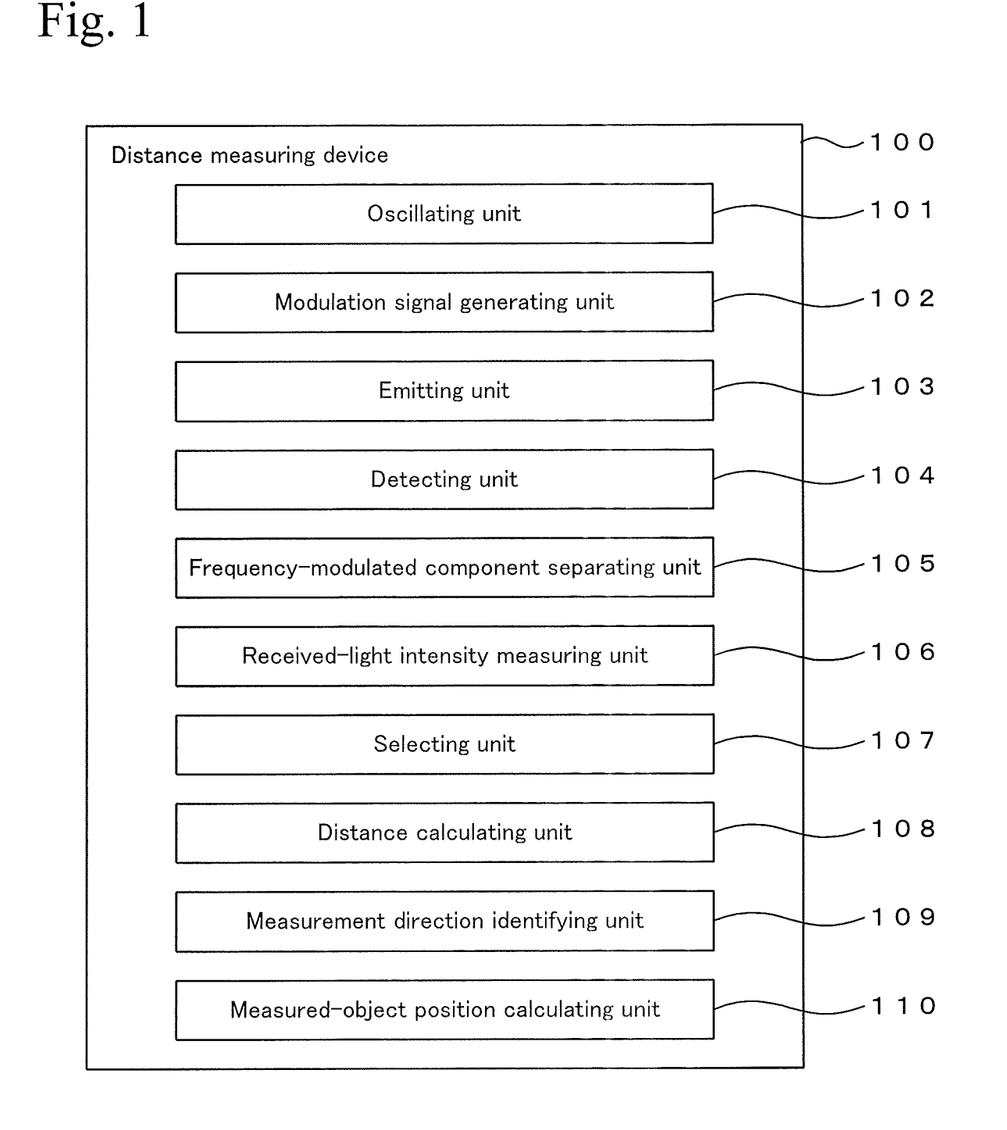
FIG. 1 is a block diagram of an embodiment.

FIG. 1 shows a distance measuring device 100. The distance measuring device 100 includes an oscillating unit 101, a modulation signal generating unit 102, an emitting unit 103, a detecting unit 104, a frequency-modulated component separating unit 105, a received-light intensity measuring unit 106, a selecting unit 107, a distance calculating unit 108, a measurement direction identifying unit 109, and a measured-object position calculating unit 110. Moreover, the distance measuring device 100 is equipped with a microcomputer for controlling operation of the distance measuring device 100, a control panel for a storage device that stores various data, such as a semiconductor memory, and an interface function for communicating with an external memory or an external device such as a personal computer (PC) or a tablet computer. In the following descriptions, each functional unit that performs digital processing uses a semiconductor integrated circuit such as a CPU or an FPGA. In this case, a semiconductor integrated circuit may be prepared for each function, or a semiconductor integrated circuit that performs multiple functions may be prepared.

The oscillating unit 101 is a laser oscillating unit that generates a distance measuring laser light. This unit can be structured by using a publicly known semiconductor laser oscillating unit. The wavelength of the distance measuring light is, for example, approximately 600 to 1000 nm, and it may be of another wavelength. The oscillating unit 101 applies AM modulation to a semiconductor laser oscillator by using a modulation signal and directly modulates the laser light to be generated. The modulation signal is generated by a modulation signal generating unit 102, which is described later. Alternatively, the modulation of the laser light may be performed by an external modulation system, such that a generated laser light is modulated by using an electro-optical effect, an acousto-optical effect, a magneto-optical effect, a thermo-optical effect, a nonlinear optical effect, or the like. In this case, the laser light, which is generated by the oscillating unit 101, is modulated by an external modulator, such as a modulator using ferroelectric crystals.

The modulation signal generating unit 102 is an electric circuit that generates a modulation signal to be used for the modulation. Here, for example, a modulation signal of 75 MHz is generated. The modulation signal generating unit 102 can also output a second hainionic, a third harmonic, a fourth harmonic, a fifth harmonic, and a higher order harmonic, of the modulation signal of 75 MHz. The modulation signal is generated by a crystal oscillator, a ceramic oscillator, a direct digital synthesizer (DDS), a PLL circuit, or another device.

The emitting unit 103 emits a distance measuring light to an outside object. The distance measuring light is the laser light that is oscillated from the oscillating unit 101 and that is modulated by the modulation signal. The emitting unit 103 includes an optical system for emitting the distance measuring laser light to an object, a mechanism for emitting the distance measuring laser light to the outside while scanning, an angle measuring device for measuring an emitting direction of the laser light, such as a rotary encoder, and peripheral circuits of the angle measuring device. These structural components are the same as those of an ordinary laser distance measuring device or of a laser scanning device.

The detecting unit 104 detects the distance measuring laser light that is reflected from the object. The detecting unit 104 includes an optical system, a detecting device for the distance measuring light, such as a photodiode, and an electric circuit for processing output of the detecting device and outputting a detection signal.

The frequency-modulated component separating unit 105 is an electric circuit that separates the distance measuring light, which is detected by the detecting unit 104, into respective modulated components contained therein. In this embodiment, the frequency-modulated component separating unit 105 includes a filter circuit using a filter such as a ceramic filter or a crystal filter, and the distance measuring light is separated into respective modulated components by the filter circuit. The separated modulated components are converted into digital signals by an A/D conversion circuit and are transmitted to the received-light intensity measuring unit 106. Alternatively, the separation into the respective modulated components may be performed by a digital filter.

The distance measuring light that is emitted from the emitting unit 103 to the object contains modulated components of 75 MHz and harmonic frequencies of 75 MHz, as described above. Naturally, the light that is reflected from the object and that is detected by the detecting unit 104 also contains modulated components similar to those of the distance measuring light. The frequency-modulated component separating unit 105 separates the detected light into modulated components corresponding to the modulated components of 75 MHz and the harmonic frequencies of 75 MHz. According to this processing, modulated components of 75 MHz, 150 MHz, 225 MHz, 300 MHz, 375 MHz, and higher harmonic frequencies are respectively separated from the detected light. For example, the second to the fifth harmonic components are to be separated. In this embodiment, the harmonic components of 375 MHz and smaller frequencies are separated. Naturally, a further higher order harmonic component may also be separated.

The received-light intensity measuring unit 106 measures a received-light intensity of each of the frequency-modulated components by such as an SN ratio after the frequency-modulated components are respectively separated by the frequency-modulated component separating unit 105. This processing is performed by software. The selecting unit 107 selects a modulated component that has a received-light intensity satisfying a predetermined condition, by referring to the received-light intensity of each of the frequency-modulated components after the received-light intensity measuring unit 106 measures the received-light intensity. Specifically, a component that is modulated by the highest order frequency is selected from among the modulated components that have light receiving intensities exceeding a predetermined threshold value. This processing is performed by software as in the case of the above processing. In this processing, alternatively, a modulated component having the highest received-light intensity may be selected. The threshold value is set at a received-light intensity at a degree by which a distance is calculated without any trouble.

The distance calculating unit 108 calculates a distance to the object based on the modulated component selected by the selecting unit 107. The distance is calculated by a distance measuring method using a phase difference. The following briefly describes the principle. First, an AM modulated laser light is emitted to an object, and light reflected from the object is received. Thus, a phase difference is generated between the emitted light and the reflected light. This phase difference is proportional to the flight time of the laser light. The flight time of the laser light is proportional to the flight distance, that is, a propagation distance, of the laser light. Thus, the distance to the object, specifically, the distance to a reflecting position, is calculated from the phase difference. The distance calculating unit 108 calculates a distance to the reflecting position at which the distance measuring laser light is reflected, in accordance with this principle.

In this embodiment, a reference optical path is provided in the distance measuring device 100 separately from the optical system of the emitting unit 103. The reference optical path is very short and naturally has an optical path length of a fixed value. Reference light is obtained by branching the distance measuring light, which is oscillated by the oscillating unit 101, and is led to the reference optical path. The reference light propagating through the reference optical path is detected by a component similar to the detecting unit 104. A signal of the detection of the reference light is used as a reference signal. To calculate the distance, the reference signal and the detection signal of the light that is reflected from the object are compared with each other. The detection signal is also called a "distance measurement signal". Since the propagation distances of the reference light and the distance measuring light differ from each other, a phase difference is generated between the modulated components of the reference signal and the detection signal (distance measurement signal). This phase difference corresponds to the distance to the object. Accordingly, the distance to the object is calculated from the phase difference by using a relationship between the phase difference and the distance to be measured, which is preliminarily obtained. Specifically, the phase difference between the reference signal and the measured signal (distance measurement signal) is detected by a phase difference detecting circuit or phase difference detecting software, and the detected phase difference is compared with distance information obtained in advance, whereby the distance to the object is calculated. This processing is performed by the distance calculating unit 108.

The measurement direction identifying unit 109 obtains an incoming direction of the detected light, based on which the distance is calculated, or the emitting direction of the corresponding distance measuring light. As described above, the emitting unit 103 includes an angle measuring device that measures the emitting direction of the distance measuring light or the incoming direction of the detected light, and the emitting unit 103 outputs a signal of the measured direction. The measurement direction identifying unit 109 identifies the direction of the position of the object as viewed from the distance measuring device 100, in accordance with the signal of the measured direction.

The measured-object position calculating unit 110 calculates a three-dimensional position of the object relative to the distance measuring device 100 by using the distance from the distance measuring device 100 to the object and the direction of the object as viewed from the distance measuring device 100. The distance from the distance measuring device 100 to the object is calculated by the distance calculating unit 108. The direction of the object is identified by the measurement direction identifying unit 109. This processing is performed in accordance with a principle such that a position of a target relative to a viewpoint is identified by determining a direction and a distance from the viewpoint to the target. Here, an absolute position on the map of the object can be calculated by identifying the position of the distance measuring device 100 on the map.

Example of Processing

Figure 5:
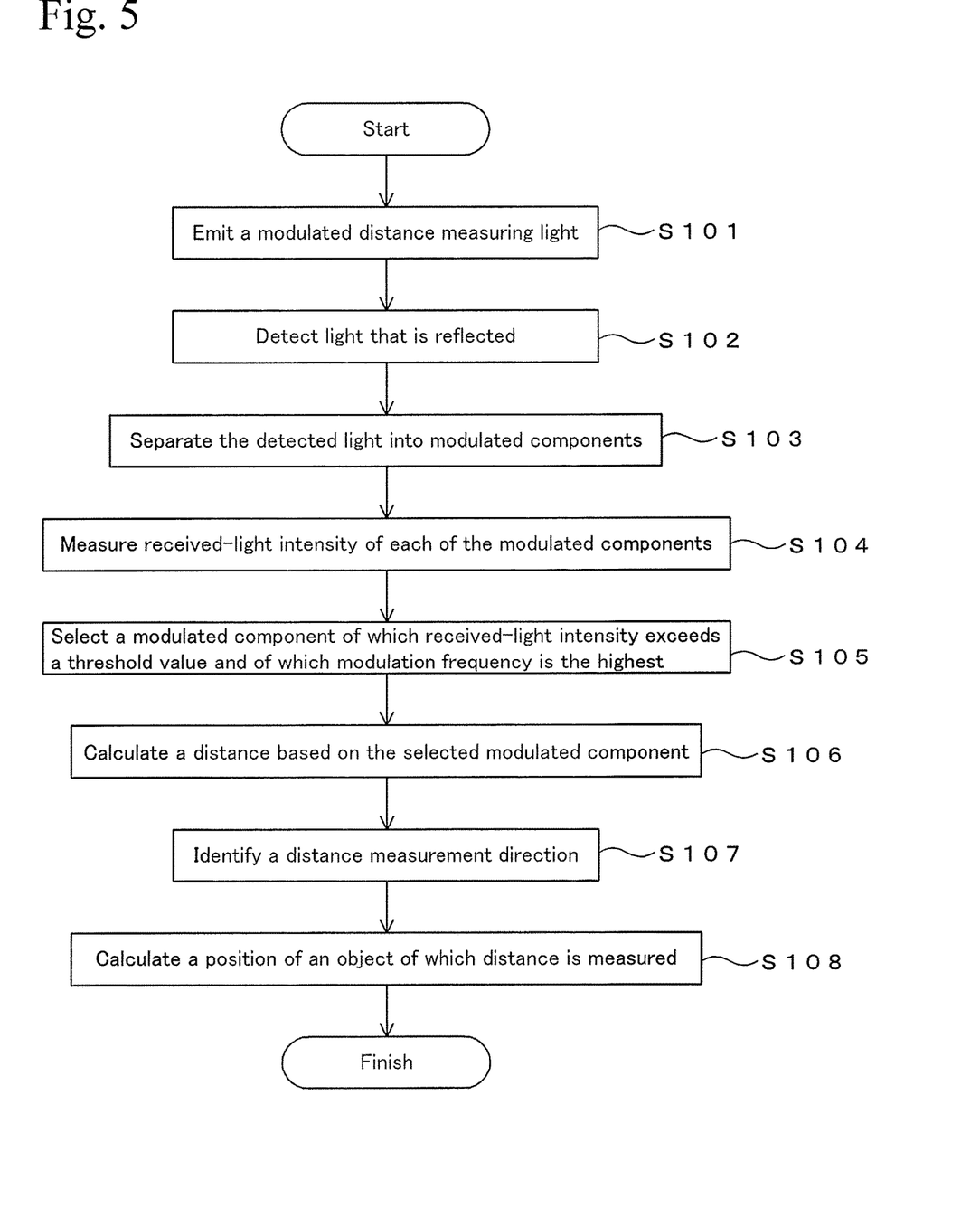
FIG. 5 is a flow chart showing an example of a processing procedure.

FIG. 5 is a flow chart showing an example of a processing procedure that is performed in the distance measuring device 100. Programs for executing the processing shown in FIG. 5 are stored in the storage device equipped on the distance measuring device 100, such as a semiconductor memory, and the programs are executed by the microcomputer equipped on the distance measuring device 100. Alternatively, the programs may be stored in an appropriate external storage region and may be provided therefrom.

First, laser light is modulated by a modulation frequency of 75 MHz and the higher order harmonic, and the modulated laser light is emitted to an object as a distance measuring light (step S101). Then, light of the modulated laser light reflected from the object is detected (step S102), and a detection signal of the detected light is separated into respective frequency-modulated components (step S103). Next, a received-light intensity is measured with respect to each of the separated frequency-modulated components (step S104).

Thereafter, components that have received-light intensities exceeding a threshold value are preliminarily selected from among the separated multiple frequency-modulated components, and furthermore, a component that is modulated by the highest order frequency is selected from these preliminarily selected components (step S105). Then, a distance to a point at which the distance measuring light is reflected is calculated by using the frequency-modulated component, which is selected in step S105 (step S106), and a direction to the point is also calculated (step S107). Finally, the position of the point at which the distance measuring light is reflected is calculated by using the results obtained in steps S106 and S107.

Effects

Figure 4:
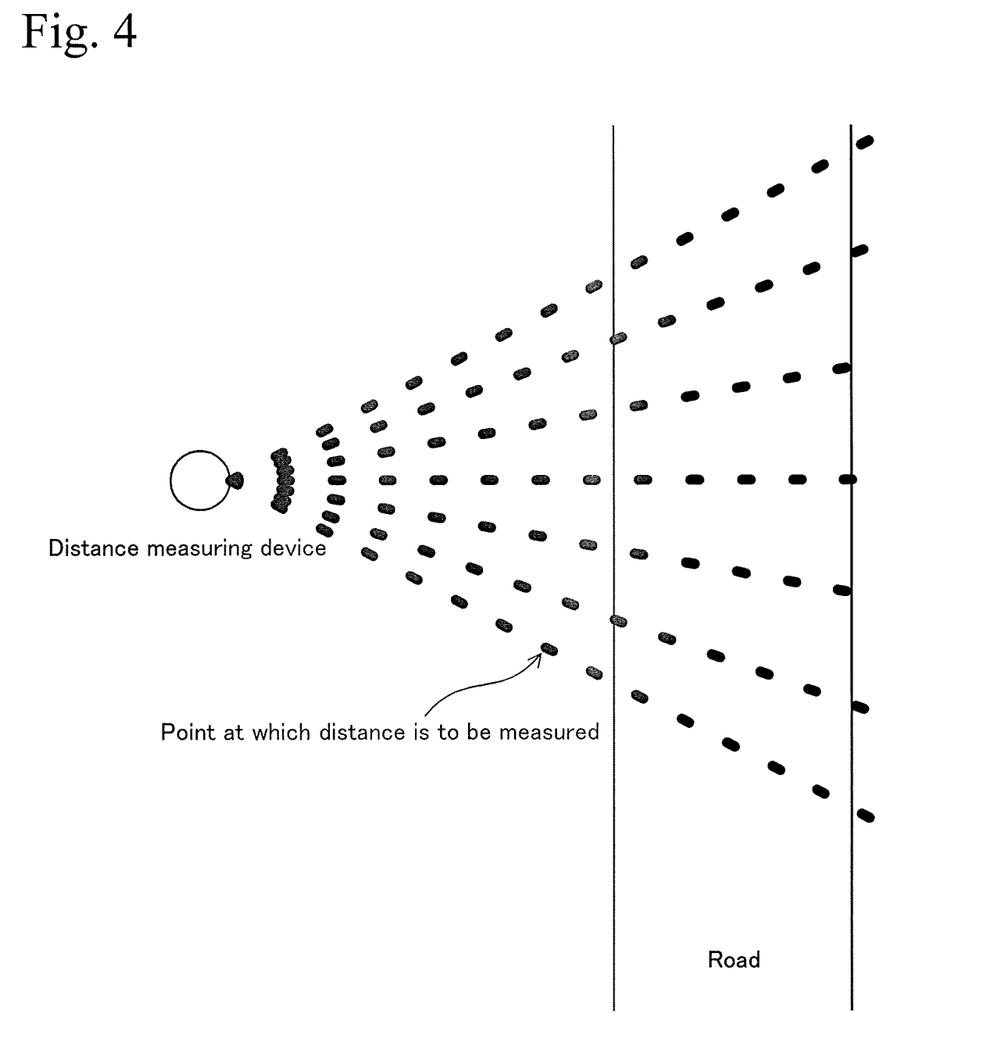
FIG. 4 is an explanatory diagram showing a distance measuring situation.

Hereinafter, a case of surveying a road surface is described. A distance measuring laser light that is modulated by a modulation frequency of 75 MHz and the second to the fifth harmonics of 75 MHz is emitted to an object to be surveyed. The distance measuring laser light is emitted, for example, so as to scan the object as shown in FIG. 4.

Figure 2:
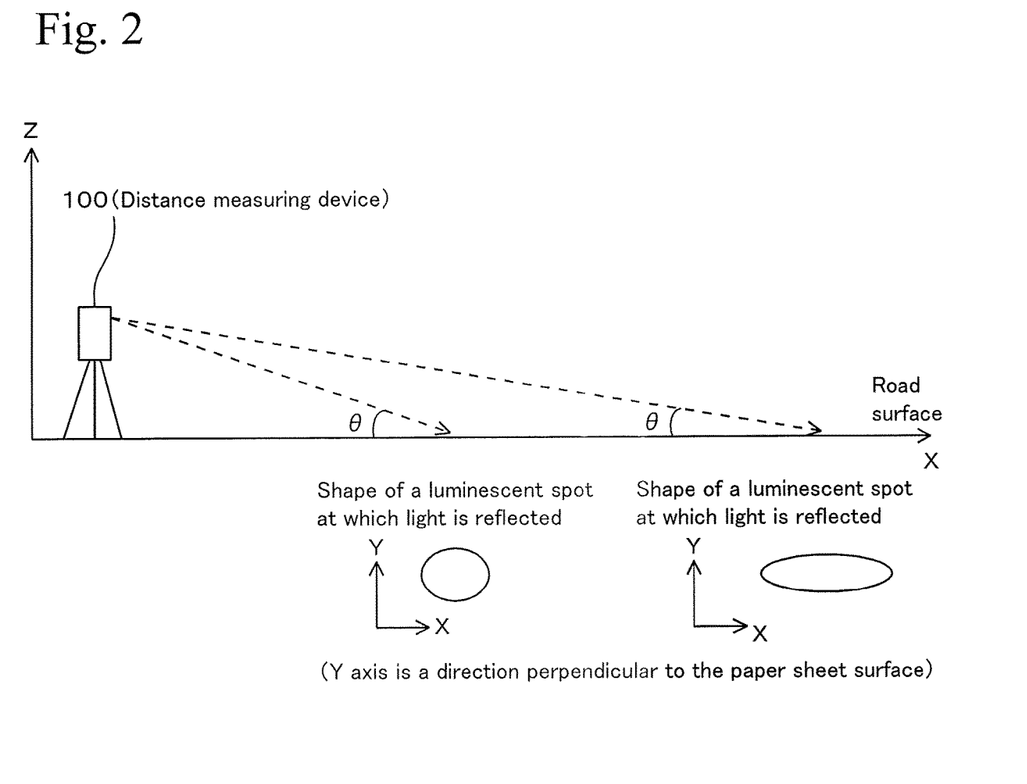
FIG. 2 is an explanatory diagram of an embodiment.

In the case of surveying a road surface, as a point, for which distance is to be measured, is separated farther from the distance measuring device, the distance measuring light is more obliquely incident on the road surface, that is, the angle θ decreases, as shown in FIG. 2. As a result, a luminescent spot of an irradiated point has an ellipse shape having a longer major axis. As the major axis of the ellipse shape increases, variation in the distance within the reflecting position, at which the distance measuring light is reflected, increases. When the luminescent spot of the portion that is irradiated with the emitted light is a point, such a problem does not occur. Otherwise, as the angle θ decreases, that is, the distance to be measured increases, the luminescent spot tends to have a longer elliptical shape, and thus, the above phenomenon becomes conspicuous.

Figure 3A:
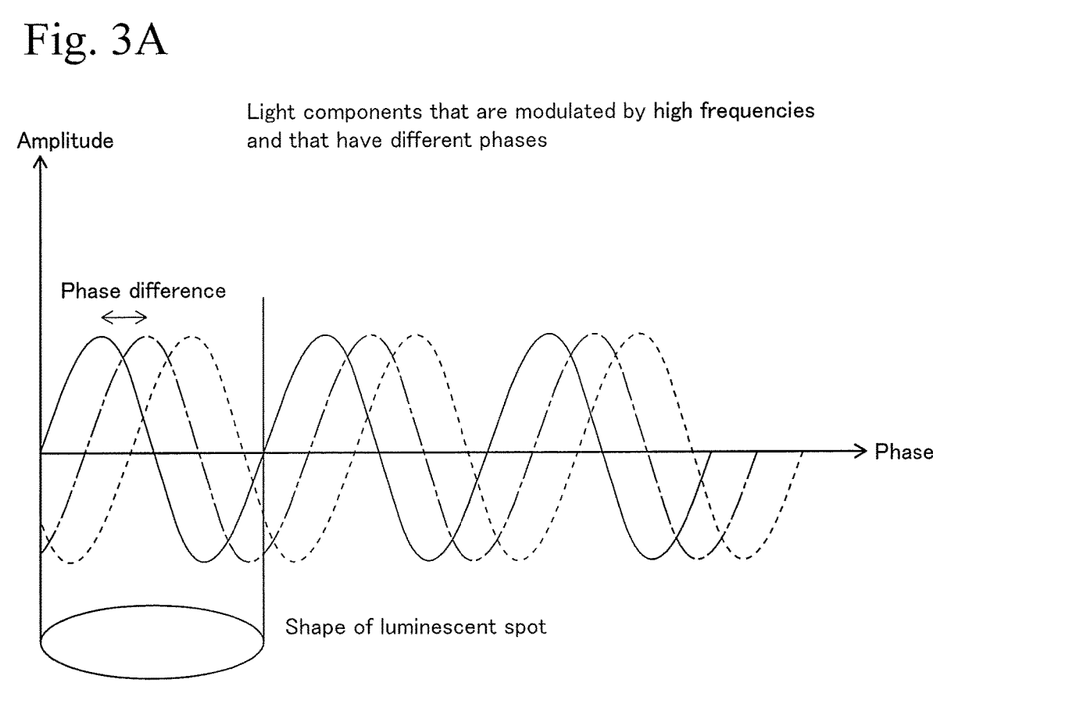
FIGS. 3A and 3B are waveform charts respectively showing a condition of the phases of a detected distance measuring light.
Figure 3B:
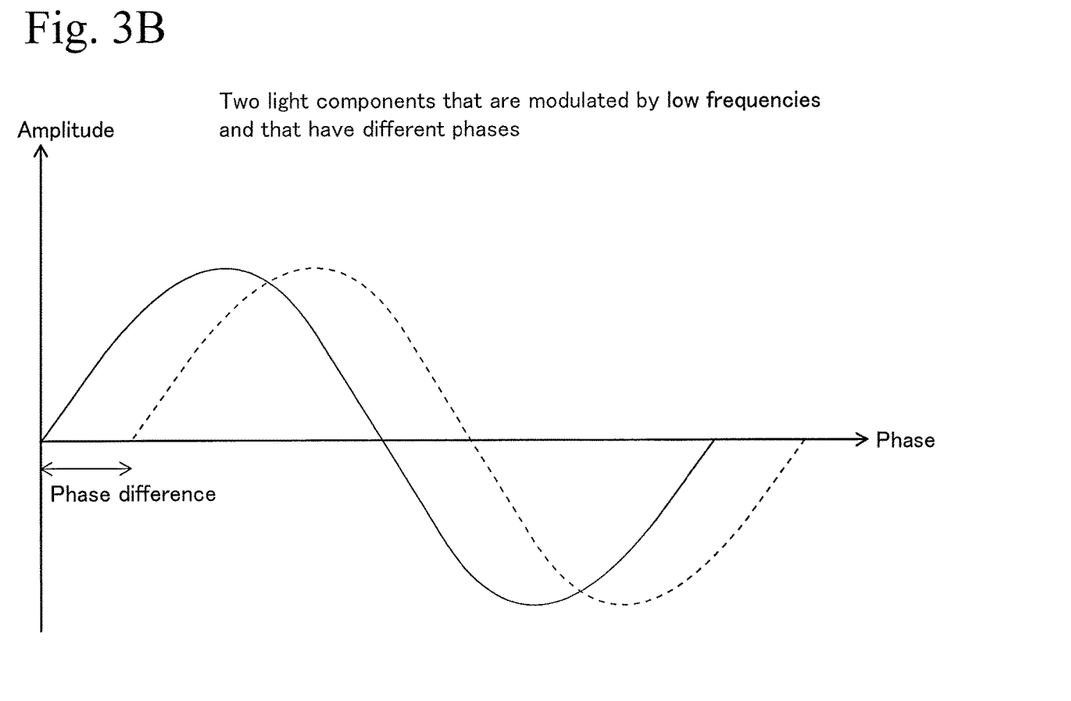

FIG. 3A shows a condition of a phase difference between components of a reflected light in a case of using a relatively high modulation frequency. FIG. 3B shows a condition of a phase difference between components of a reflected light in a case of using a relatively low modulation frequency. In the case of using a high modulation frequency, when a phase difference or dispersion occurs in a reflected light as described above, reflected light components that have phases differing from each other exist at the same time and thereby interfere with each other, as shown in FIG. 3A. That is, in the case of using the high modulation frequency, when a luminescent spot at a reflecting position has an ellipse shape, and the reflecting position is separated farther in the distance measuring direction, one wavelength of a modulated wave is contained in a range in the major axis direction of the ellipse, as conceptually shown in FIG. 3A. In this condition, when the reflected light of the distance measuring light contains multiple waves of which phases differ from each other, peaks of the waves and troughs of the other waves tend to overlap, whereby the reflected light components greatly interfere with each other. As a result, the reflected light is detected at a low received-light intensity. On the other hand, in the case of using the low modulation frequency, as shown in FIG. 3B, even when the luminescent spot at the reflecting position has an ellipse shape, and a phase difference is generated between the reflected light components, the distance between a peak and a trough of the wave is long, whereby a peak of the wave and a trough of the other wave tend not to overlap. As a result, the waves of which phases are different from each other do not greatly interfere with each other, and the received-light intensity of the detected light is not greatly decreased.

For example, a modulation frequency of 300 MHz has a wavelength of 1 meter. Thus, when a luminescent spot with an ellipse shape has a major axis of several tens of centimeters, waves, of which phases are different from each other in the reflected light, exist in the condition as shown in FIG. 3A and greatly interfere with each other. For example, in the case of the modulation frequency of 300 MHz, when the major axis of a luminescent spot is 25 cm, the difference of the waves is 50 cm in a round trip, and the phase difference between the corresponding two reflected light components is 180 degrees. As a result, peaks and troughs of the waves overlap, and the waves cancel each other. On the other hand, in a case of a modulation frequency of 75 MHz, which has a wavelength of 4 meters, even when a luminescent spot with an ellipse shape has a major axis of several tens of centimeters, a phase difference is approximately several tens of centimeters, whereby the waves of the reflected light components do not greatly interfere with each other, as shown in FIG. 3B. For the above reasons, in measuring a road surface, when the distance to be measured is long, using a high modulation frequency decreases a received-light intensity of a detected reflected light. However, the decrease in the received-light intensity of the detected reflected light is reduced by using a low modulation frequency, even when a long distance is to be measured.

In this embodiment, the received-light intensity of each of the multiple frequency-modulated components of the detected reflected light is measured, and a distance is calculated by using a component of which the received-light intensity exceeds a threshold value. Thus, insufficiency in the received-light intensity of the detected distance measuring light due to the above reasons is avoided. Accordingly, an even longer distance can be measured. Moreover, a component that is modulated by the highest frequency is selected from among multiple frequency-modulated components having high light receiving intensities, and thus, the measurement is performed with the highest distance resolution under that condition.

Advantages

The distance measuring device 100 of this embodiment includes the emitting unit 103, the detecting unit 104, the frequency-modulated component separating unit 105, the selecting unit 107, and the distance calculating unit 108. The emitting unit 103 emits distance measuring light to an object to be measured. The distance measuring light is modulated by multiple modulation frequencies. The detecting unit 104 receives and detects light of the distance measuring light that is reflected from the object. The separating unit 105 separates components of the detected reflected light into multiple frequency-modulated components. The selecting unit 107 selects a frequency-modulated component that has a received-light intensity exceeding a threshold value from among the separated multiple frequency-modulated components. The distance calculating unit 108 calculates a distance to the object based on the selected frequency-modulated component.

According to this structure, the detected reflected light is separated into respective frequency-modulated components, and the received-light intensity is measured with respect to each of the frequency-modulated components. Then, a component that is modulated by the highest modulation frequency is selected from among the components having light receiving intensities exceeding a threshold value, and the selected component is used for calculating a distance. Accordingly, even when a distance to be measured is long, situations in which it is impossible to take measurements hardly occur, and the distance is measured with the highest resolution under the measurement performed condition.

Other Matters

In addition to, or as an alternative to, the harmonics, multiple modulation frequencies may be obtained by preparing an oscillator that oscillates modulation signals of which oscillation frequencies are different from each other. Additionally, the object, of which the distance is to be measured, is not limited to a road surface, and may be a wall surface of a building, which is unavoidably irradiated with a distance measuring light from an oblique direction, or it may be another object.

The distance measuring device 100 may be constructed so that an operator can select one frequency-modulated component when multiple frequency-modulated components of which received-light intensities exceed a threshold value are selected by the selecting unit 107. As an alternative to selecting a component that is modulated by the highest frequency when multiple frequency-modulated components of which received-light intensities exceed a threshold value are selected, a component may be selected from among multiple frequency-modulated components that are selected by using another condition.

For example, when multiple frequency-modulated components of which received-light intensities exceed a threshold value are selected by the selecting unit 107, a distance may be calculated based on each of the multiple frequency-modulated components for multiple times, and a component by which the variation in the calculated results is the minimum may be selected. Even when a received-light intensity of a signal exceeds a threshold value, there may be cases in which a S/N ratio is at a lowest allowable degree and in which the signal is unreliable for some reason. In such cases, the distance may be calculated multiple times, and the stability of the values of the calculation may be evaluated, whereby a measured value is obtained with higher reliability.

What is claimed is:

1. A distance measuring device comprising:
    a distance measuring light emitting unit that emits measuring light to an object to be measured, the distance measuring light being modulated by multiple modulation frequencies;
    a detecting unit that receives and detects light of the distance measuring light that is reflected from the object;
    a separating unit that separates the detected reflected light into multiple frequency-modulated components;
    a processor or circuit configured to perform as a selecting unit that selects at least two frequency-modulated components that have a received-light intensity exceeding a threshold value from among the separated multiple frequency-modulated components; and
    the processor or circuit further configured to perform as a distance calculating unit that calculates a distance to the object based on the at least two selected frequency-modulated components,
    wherein the calculating of the distance is performed with respect to each of multiple times of detected light corresponding to each of the at least two selected frequency-modulated components, and the frequency-modulated component resulting in the smallest variation of the distance calculated in the calculating of the distance for each of the multiple times of the detected light is selected as a result of the calculation.

2. The distance measuring device according to claim 1, wherein the multiple frequency-modulated components have a frequency of a fundamental wave and a frequency of a harmonic wave of the fundamental wave.

3. The distance measuring device according to claim 2, wherein the selecting unit selects a component that is modulated by the highest modulation frequency from among the multiple frequency-modulated components that have received-light intensities exceeding the threshold value.

4. The distance measuring device according to claim 2, further comprising:
a position calculating unit that calculates a position of the object based on the distance to the object and based on a direction of emitting the distance measuring light.

5. The distance measuring device according to claim 1, wherein the selecting unit selects a component that is modulated by the highest modulation frequency from among the multiple frequency-modulated components that have received-light intensities exceeding the threshold value.

6. The distance measuring device according to claim 5, further comprising:
a position calculating unit that calculates a position of the object based on the distance to the object and based on a direction of emitting the distance measuring light.

7. The distance measuring device according to claim 1, further comprising:
a position calculating unit that calculates a position of the object based on the distance to the object and based on a direction of emitting the distance measuring light.

8. A distance measuring method comprising:
emitting distance measuring light to an object to be measured, the distance measuring light being modulated by multiple modulation frequencies;
receiving and detecting light of the distance measuring light that is reflected from the object;
separating the detected reflected light into multiple frequency-modulated components;
selecting at least two frequency-modulated components having a received-light intensity exceeding a threshold value from among the separated multiple frequency-modulated components; and
calculating a distance to the object based on the at least two selected frequency-modulated components,
wherein the calculating the distance is performed with respect to each of multiple times of the receiving and detecting light corresponding to each of the at least two selected frequency-modulated components, and the frequency-modulated component resulting in the smallest variation of the distance calculated in the calculating for each of the multiple times of the detecting is selected as a result of the calculating.

9. A non-transitory computer recording medium storing computer executable instructions for calculating a position of a reflection object that, when executed by a computer processor, cause the computer processor to:
emit distance measuring light to an object to be measured, the distance measuring light being modulated by multiple modulation frequencies;
receive and detect light of the distance measuring light that is reflected from the object;
separate the detected reflected light into multiple frequency-modulated components;
select at least two frequency-modulated components having a received-light intensity exceeding a threshold value from among the separated multiple frequency-modulated components; and
calculate a distance to the object based on the at least two selected frequency-modulated components,
wherein the calculation of the distance is performed with respect to each of multiple times of detected light corresponding to each of the at least two selected frequency-modulated components, and the frequency-modulated component resulting in the smallest variation of the distance calculated by the calculating of the distance for each of the multiple times of the detected light is selected as a result of the calculation.

* * * * *